US012682284B2

(12) United States Patent
Tolmachev et al.

(10) Patent No.: US 12,682,284 B2
(45) Date of Patent: Jul. 14, 2026

(54) RECORDING MEDIUM, MACHINE LEARNING METHOD, AND MACHINE LEARNING DEVICE

(71) Applicant: FUJITSU LIMITED, Kawasaki (JP)

(72) Inventors: Arseny Tolmachev, Kawasaki (JP); Akira Sakai, Kawasaki (JP); Masaru Todoriki, Kita (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 18/124,630

(22) Filed: Mar. 22, 2023

(65) Prior Publication Data

US 2023/0229967 A1 Jul. 20, 2023

Related U.S. Application Data

(63) Continuation of application No. PCT/JP2020/038681, filed on Oct. 13, 2020.

(51) Int. Cl.
G06N 20/00 (2019.01)

(52) U.S. Cl.
CPC .................................... G06N 20/00 (2019.01)

(58) Field of Classification Search
CPC ........ G06N 20/00; G06N 20/10; G06N 20/20; G06N 3/09; G06F 17/16
See application file for complete search history.

(56) References Cited

U.S. PATENT DOCUMENTS 11,803,752 B2 * 10/2023 Liu ...................... G05B 13/048
2017/0046307 A1 2/2017 Lvov et al.

2019/0278600 A1 * 9/2019 Frumkin ................ G06N 3/044
2020/0257974 A1 * 8/2020 Yano ........................ G06F 17/16
2021/0042624 A1 * 2/2021 Matveev .............. G06N 3/0464
(Continued)

FOREIGN PATENT DOCUMENTS

EP          3893104 A1 * 10/2021 ............. G06N 3/045
JP      2016-139391 A    8/2016
WO    2020/008513 A1    1/2020

OTHER PUBLICATIONS

T. G. Kolda and J. Sun, "Scalable Tensor Decompositions for Multi-aspect Data Mining," 2008 Eighth IEEE International Conference on Data Mining, Pisa, Italy, 2008, pp. 363-372.*

(Continued)

*Primary Examiner* — Pierre Michel Bataille
(74) *Attorney, Agent, or Firm* — XSENSUS LLP

(57) ABSTRACT

A machine learning process including identifying a first axis including elements represented by one-hot vectors and a second axis including elements not represented by one-hot vectors, among a plurality of axes included in tensor-form data, when calculating a core tensor from the tensor-form data via a plurality of intermediate tensors, calculating the core tensor from the tensor-form data by a first process of concatenating elements included in a first element matrix corresponding to the first axis to elements included in a first intermediate tensor among the plurality of intermediate tensors and a second process of calculating a mode product between a second intermediate tensor among the plurality of intermediate tensors and a second element matrix corresponding to the second axis, and performing machine learning of a machine learning model with the core tensor as an input.

6 Claims, 14 Drawing Sheets

| START ID | END ID | START ELEMENT | END ELEMENT | BINDING | FORM |
|---|---|---|---|---|---|
| 1 | 2 | C | H | 1 | [1] |
| 1 | 3 | C | H | 1 | [1] |
| 1 | 4 | C | O | 2 | [1] |
| 2 | 1 | H | C | 1 | [1] |
| 3 | 1 | H | C | 1 | [1] |
| 4 | 1 | O | C | 2 | [1] |

ELEMENT MATRIX (FORM: [2, a]) WITH RESPECT TO PARAMETER MODE "5"

| START ID | END ID | START ELEMENT | END ELEMENT | BINDING | FORM |
|---|---|---|---|---|---|
| 1 | 2 | C | H | 1 | [a] |
| 1 | 3 | C | H | 1 | [a] |
| 1 | 4 | C | O | 2 | [a] |
| 2 | 1 | H | C | 1 | [a] |
| 3 | 1 | H | C | 1 | [a] |
| 4 | 1 | O | C | 2 | [a] |

| START ID | END ID | START ELEMENT | END ELEMENT | BINDING | FORM |
|---|---|---|---|---|---|
| 1 | 2 | C | H | 1 | [1] |
| 1 | 3 | C | H | 1 | [1] |
| 1 | 4 | C | O | 2 | [1] |
| 2 | 1 | H | C | 1 | [1] |
| 3 | 1 | H | C | 1 | [1] |
| 4 | 1 | O | C | 2 | [1] |

| START ID | END ID | START ELEMENT | END ELEMENT | BINDING | FORM |
|---|---|---|---|---|---|
| 1 | 2 | C | H | 1 | [a+1] |
| 1 | 3 | C | H | 1 | [a+1] |
| 1 | 4 | C | O | 2 | [a+1] |
| 2 | 1 | H | C | 1 | [a+1] |
| 3 | 1 | H | C | 1 | [a+1] |
| 4 | 1 | O | C | 2 | [a+1] |

(56) References Cited

U.S. PATENT DOCUMENTS

| | | | | |
|---|---|---|---|---|
| 2021/0097432 A1* | 4/2021 | Olgiati | .................... | G06F 17/18 |
| 2021/0158165 A1* | 5/2021 | Liu | ........................ | G06N 3/045 |
| 2021/0271735 A1 | 9/2021 | Kimura et al. | | |
| 2021/0365522 A1* | 11/2021 | Narita | .................... | G06N 3/084 |
| 2022/0044149 A1* | 2/2022 | Rand | ..................... | G06N 20/00 |
| 2022/0237511 A1* | 7/2022 | Tolmachev | ............ | G06N 20/00 |

OTHER PUBLICATIONS

Y. Ji, Q. Wang, X. Li and J. Liu, "A Survey on Tensor Techniques and Applications in Machine Learning," in IEEE Access, vol. 7, pp. 162950-162990, 2019.*

Mo Yu et al: "Embedding Lexical Features via Low-Rank Tensors", arxiv.org, Cornell University Library, 201 Olin Library Cornell University Ithaca, NY 14853, Apr. 2, 2016 (Apr. 2, 2016), XP080692927.

Guo Xiaoding et al: "RnnTd: An Approach Based on LSTM and Tensor Decomposition for Classification of Crimes in Legal Cases", 2019 IEEE Fourth International Conference on Data Science in Cyberspace (DSC), IEEE, Jun. 23, 2019 (Jun. 23, 2019), pp. 16-22, XP033645255.

Extended European Search Report issued Oct. 25, 2023, in corresponding European Patent Application No. 20957644.6, 11 pages.

International Search Report and Written Opinion mailed on Nov. 24, 2020, received for PCT Application PCT/JP2020/038681, filed on Oct. 13, 2020, 11 pages including English Translation.

Ahmadi-Als et al., "Randomized Algorithms for Computation of Tucker decomposition and Higher Order SVD (HOSVD)", arXiv:2001. 07124v3, Sep. 1, 2020, pp. 1-23.

Murakami et al., "Introduction to multidimensional data processing using statistical software R", Tokyo: Nisshin Shuppan KK, Mar. 30, 2017, pp. 219-244.

Maruhashi et al., "Learning Multi-Way Relations via Tensor Decomposition with Neural Networks", The Thirty-Second AAAI Conference on Artificial Intelligence (AAAI-18), 2018, pp. 3770-3777.

Liu et al., "COSTCo: A Neural Tensor Completion Model for Sparse Tensors", Research Track Paper, KDD'19, Proceedings of 25th ACM SIGKDD International Conference on Knowledge Discovery & Data Mining, Aug. 4-8, 2019, pp. 324-334.

* cited by examiner

| START ID | END ID | START ELEMENT | END ELEMENT | BINDING |
|---|---|---|---|---|
| 1 | 2 | C | H | 1 |
| 1 | 3 | C | H | 1 |
| 1 | 4 | C | O | 2 |
| 2 | 1 | H | C | 1 |
| 3 | 1 | H | C | 1 |
| 4 | 1 | O | C | 2 |

TOPOLOGY        LABEL

Figure 7A:
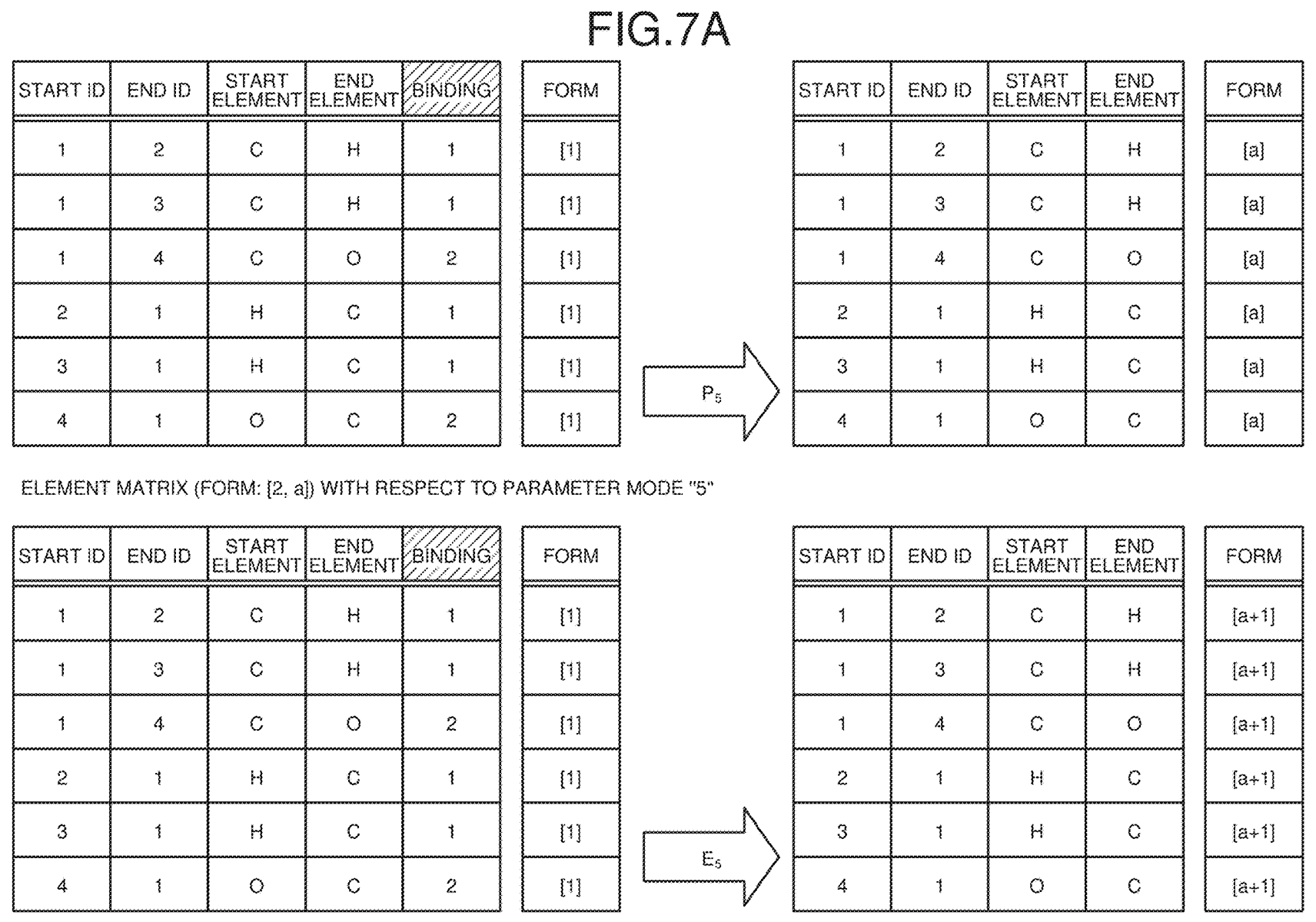

| START ID | END ID | START ELEMENT | END ELEMENT | BINDING | FORM |
|---|---|---|---|---|---|
| 1 | 2 | C | H | 1 | [1] |
| 1 | 3 | C | H | 1 | [1] |
| 1 | 4 | C | O | 2 | [1] |
| 2 | 1 | H | C | 1 | [1] |
| 3 | 1 | H | C | 1 | [1] |
| 4 | 1 | O | C | 2 | [1] |

P₅ →

| START ID | END ID | START ELEMENT | END ELEMENT | FORM |
|---|---|---|---|---|
| 1 | 2 | C | H | [a] |
| 1 | 3 | C | H | [a] |
| 1 | 4 | C | O | [a] |
| 2 | 1 | H | C | [a] |
| 3 | 1 | H | C | [a] |
| 4 | 1 | O | C | [a] |

ELEMENT MATRIX (FORM: [2, a]) WITH RESPECT TO PARAMETER MODE "5"

| START ID | END ID | START ELEMENT | END ELEMENT | BINDING | FORM |
|---|---|---|---|---|---|
| 1 | 2 | C | H | 1 | [1] |
| 1 | 3 | C | H | 1 | [1] |
| 1 | 4 | C | O | 2 | [1] |
| 2 | 1 | H | C | 1 | [1] |
| 3 | 1 | H | C | 1 | [1] |
| 4 | 1 | O | C | 2 | [1] |

E₅ →

| START ID | END ID | START ELEMENT | END ELEMENT | FORM |
|---|---|---|---|---|
| 1 | 2 | C | H | [a+1] |
| 1 | 3 | C | H | [a+1] |
| 1 | 4 | C | O | [a+1] |
| 2 | 1 | H | C | [a+1] |
| 3 | 1 | H | C | [a+1] |
| 4 | 1 | O | C | [a+1] |

FIG.7B

ELEMENT MATRIX (FORM: [3, b]) WITH RESPECT TO PARAMETER MODE "4"

Bottom-left (source) table

| START ID | END ID | START ELEMENT | END ELEMENT | FORM |
|---|---|---|---|---|
| 1 | 2 | C | H | [a] |
| 1 | 3 | C | H | [a] |
| 1 | 4 | C | O | [a] |
| 2 | 1 | H | C | [a] |
| 3 | 1 | H | C | [a] |
| 4 | 1 | O | C | [a] |

$P_4$ →

Top-left table

| START ID | END ID | START ELEMENT | FORM |
|---|---|---|---|
| 1 | 2 | C | [b, a] |
| 1 | 3 | C | [b, a] |
| 1 | 4 | C | [b, a] |
| 2 | 1 | H | [b, a] |
| 3 | 1 | H | [b, a] |
| 4 | 1 | O | [b, a] |

Bottom-right (source) table

| START ID | END ID | START ELEMENT | END ELEMENT | FORM |
|---|---|---|---|---|
| 1 | 2 | C | H | [a+1] |
| 1 | 3 | C | H | [a+1] |
| 1 | 4 | C | O | [a+1] |
| 2 | 1 | H | C | [a+1] |
| 3 | 1 | H | C | [a+1] |
| 4 | 1 | O | C | [a+1] |

$E_4$ →

Top-right table

| START ID | END ID | START ELEMENT | FORM |
|---|---|---|---|
| 1 | 2 | C | [a+b+1] |
| 1 | 3 | C | [a+b+1] |
| 1 | 4 | C | [a+b+1] |
| 2 | 1 | H | [a+b+1] |
| 3 | 1 | H | [a+b+1] |
| 4 | 1 | O | [a+b+1] |

ELEMENT MATRIX (FORM: [4, c]) WITH RESPECT TO PARAMETER MODE "2"

FIG.7D

| START ID | START ELEMENT | FORM |
|:---:|:---:|:---:|
| 1 | C | [c, b, a] |
| 2 | H | [c, b, a] |
| 3 | H | [c, b, a] |
| 4 | O | [c, b, a] |

$P_3$

| START ID | FORM |
|:---:|:---:|
| 1 | [b, c, b, a] |
| 2 | [b, c, b, a] |
| 3 | [b, c, b, a] |
| 4 | [b, c, b, a] |

ELEMENT MATRIX (FORM: [3, b]) WITH RESPECT TO PARAMETER MODE "3"

| START ID | START ELEMENT | FORM |
|:---:|:---:|:---:|
| 1 | C | [c, a+b+1] |
| 2 | H | [c, a+b+1] |
| 3 | H | [c, a+b+1] |
| 4 | O | [c, a+b+1] |

$E_3$

| START ID | FORM |
|:---:|:---:|
| 1 | [b+c(a+b+1)] |
| 2 | [b+c(a+b+1)] |
| 3 | [b+c(a+b+1)] |
| 4 | [b+c(a+b+1)] |

| START ID | FORM |
|:---:|:---:|
| 1 | [b, c, b, a] |
| 2 | [b, c, b, a] |
| 3 | [b, c, b, a] |
| 4 | [b, c, b, a] |

$P_1$

| - | FORM |
|:---:|:---:|
| - | [c, b, c, b, a] |

ELEMENT MATRIX (FORM: [4, c]) WITH RESPECT TO PARAMETER MODE "1"

| START ID | FORM |
|:---:|:---:|
| 1 | [b+c(a+b+1)] |
| 2 | [b+c(a+b+1)] |
| 3 | [b+c(a+b+1)] |
| 4 | [b+c(a+b+1)] |

$P_1$

| - | FORM |
|:---:|:---:|
| - | [c, b+c(a+b+1)] |

FIG.9

(a) GRAPHICAL FORM

```
    H
    |
    C ═══ O
    |
    H
```

(b) TABULAR FORM

| START ID | END ID | START ELEMENT | END ELEMENT | BINDING | VALUE |
|----------|--------|---------------|-------------|---------|-------|
| 1 | 2 | C | H | 1 | 1 |
| 1 | 3 | C | H | 1 | 1 |
| 1 | 4 | C | O | 2 | 1 |
| 2 | 1 | H | C | 1 | 1 |
| 3 | 1 | H | C | 1 | 1 |
| 4 | 1 | O | C | 2 | 1 |

(a) MODE PRODUCT (b) CALCULATE CORE TENSOR

RECORDING MEDIUM, MACHINE LEARNING METHOD, AND MACHINE LEARNING DEVICE

CROSS-REFERENCE TO RELATED APPLICATION

This application is a continuation application of International Application PCT/JP2020/038681, filed on Oct. 13, 2020 and designating the U.S., the entire contents of which are incorporated herein by reference.

FIELD

The present invention relates to a machine learning program, a machine learning method, and a machine learning device.

BACKGROUND

Tensor data may be used as training data for a system that generates a machine learning model by machine learning and performs prediction, classification, or the like by using the generated machine learning model. The tensor data is represented as an n (n is a positive integer) dimensional array, but is also represented by a graph, a table, or the like. FIG. 9 is a diagram illustrating an example in which tensor data is represented in graphical form and tabular form. FIG. 9 illustrates an example of a chemical formula. FIG. 9(a) is an example in which a chemical formula of formaldehyde is represented in graphical form, and FIG. 9(b) is an example in which the chemical formula of the formaldehyde is represented in tabular form.

In the tabular form, the chemical formula is represented by five axes (columns): start ID, end ID, start element, end element, and binding, and by values. The start ID is an index of a starting point of a linkage. The end ID is an index of an end point of the linkage. A method of assigning indices to the starting point and the end point is arbitrary. The start element is a type of an element at the starting point. The end element is a type of an element at the endpoint. The binding is a type of the linkage. The tabular form represents only nonzero values of the tensor data as rows. In FIG. 9(b), only the six values represented by the six rows are 1, and the other values of the tensor data are 0. The axis of the tensor is called a mode.

In machine learning, a data tensor is converted to a core tensor by tensor decomposition, and training is performed using the core tensor. FIG. 10 is a diagram for explaining tensor decomposition. In FIG. 10, white cubes indicate zero elements and shaded cubes indicate nonzero elements. As illustrated in FIG. 10, the data tensor is tensor-decomposed to a core tensor and element matrices corresponding to the number of modes. In FIG. 10, since the data tensor is third-order and the number of modes is 3, the data tensor is tensor-decomposed to a core tensor and three element matrices.

The core tensor is calculated by a mode product between the data tensor and the element matrix of each mode. FIG. 11 is a diagram for explaining the core tensor calculation by the mode product. FIG. 11(a) illustrates the mode product and FIG. 11(b) illustrates the core tensor calculation. As illustrated in FIG. 11(a), the mode product converts the number of elements in a mode from the number of data tensors to the number of elements in the core tensor. In the example in FIG. 11(a), the number of elements in a vertical mode is converted from 3 to 2. When there is even one nonzero element in the mode direction, all elements in the mode direction after the conversion are nonzero. In the example in FIG. 11(a), since three elements 91 in the vertical direction include nonzero, two elements 92 after the conversion are nonzero. The number of elements in each mode in the core tensor is designated by a user.

As illustrated in FIG. 11(b), the core tensor is calculated by sequentially calculating the mode product of each mode. In FIG. 11(b), $P_i$(i is 1 to 3) indicates a mode product corresponding to mode i. As illustrated in FIG. 11(b), an intermediate tensor$_1$ is calculated from the data tensor by a mode product $P_1$, an intermediate tensor$_2$ is calculated from the intermediate tensor$_1$ by a mode product $P_2$, and the core tensor is calculated from the intermediate tensor$_2$ by a mode product $P_3$. The calculation order of the mode products is arbitrary.

When an $n^{th}$ order tensor is set as X, the core tensor is set as X^, and an element matrix of the mode i (i is 1 to n) is set as $W_i$, $$X \in R^{I_1 \times I_2 \times \ldots \times I_n}$$

$$X \hat{} \in R^{J_1 \times J_2 \times \ldots \times J_n}$$

$$W_i \in R^{I_i \times J_i}$$

Where R is the set of real numbers. $I_i$ is the number of elements of the mode i in X and $J_i$ is the number of elements of the mode i in X^.

For a mode product $P_k$ of a mode k, $$X \in R^{I_k \times (I_1 \times \ldots \times I_{k-1} \times I_{k+1} \times \ldots \times I_n)}$$

a matrix product $X''=(W_k)^T \times X'$ is calculated with X as the following matrix X'.

$$X'' \in R^{J_k \times (I_1 \times \ldots \times I_{k-1} \times I_{k+1} \times \ldots \times I_n)}$$

Then, the modes of X'' are rearranged to obtain an intermediate tensor $X^{intm}$.

$$X^{intm} \in R^{I_1 \times \ldots \times I_{k-1} \times J_k \times J_{k+1} \times \ldots \times I_n}$$

As the related art regarding tensors, there is a device that speeds up a process for super-tensor factorization and reduces a memory amount needed at the time of processing. The device performs data placement processing and calculation processing on N-dimensional (N is an integer equal to or greater than 3) tensor data in a loop calculation for a plurality of indices to the tensor data. In the data placement processing, the device sequences the elements of the tensor data in order from the lowest index of the calculation loop to each index immediately preceding the highest such that the loop direction of each index is forward. Then, the device places, on a storage unit, the values of non-empty elements in the tensor data and the index values of the lowest index indicating the position of the tensor data of the elements to an index immediately preceding the highest. Then, the device performs a process of placing the count number of the non-empty elements. In the calculation processing, the device performs a loop calculation on the tensor data placed on the storage unit.

As the related art regarding tensors, there is an information processing device capable of minimizing tensor data volumes. The information processing device includes a compressed sparse fiber (CSF) design unit, a CSF creation unit, and a CSF compression unit. The CSF design unit sets an order of the axes of an $M^{th}$ or higher order tensor (M is a natural number of 3 or more) in order to convert the tensor to CSF-represented data. The CSF creation unit converts the $M^{th}$, or higher order tensor to CSF-represented data in accordance with the setting by the CSF design unit. The CSF compression unit compresses the CSF-represented data by substituting a duplicate structure occurring in the CSF-represented data by a substitute structure representing the duplicate structure, and outputs compressed CSF data which is the compressed CSF-represented data, and substitution rule data which represents a substitution rule.

As the related art, there is a method of improving matrix multiplication execution times. The method includes determining, by a graphics processing unit (GPU), optimal partitions for matrix-by-matrix multiplication of two factor matrices having known sizes. The determining step includes performing a plurality of matrix-by-matrix multiplication executions offline for each different combination of two-way partitions for a plurality of partition sizes. The determining step further includes determining performance values offline on the basis of the execution time for each multiplication execution. The determining step further includes recursively repeating the multiplication execution and the determining of the performance values offline until the best performing combination of the two-way partitions no longer improves the performance values, and saving the best performing combinations of the two-way partitions as optimal partitions. The method further includes performing online, by the GPU, the matrix-by-matrix multiplication of the two factor matrices by using calls for one of the best performing combinations of the two-way partitions.

For example, related arts are disclosed in Japanese Laid-open Patent Publication No. 2016-139391 and International Publication Pamphlet No. WO 2020/008513 and U.S. Patent No. 2017/0046307

SUMMARY

According to an aspect of the embodiments, a non-transitory computer-readable recording medium stores therein a machine learning program that causes a computer to execute a process, the process including identifying a first axis including elements represented by one-hot vectors and a second axis including elements not represented by one-hot vectors, among a plurality of axes included in tensor-form data, when calculating a core tensor from the tensor-form data via a plurality of intermediate tensors, calculating the core tensor from the tensor-form data by a first process of concatenating elements included in a first element matrix corresponding to the first axis to elements included in a first intermediate tensor among the plurality of intermediate tensors and a second process of calculating a mode product between a second intermediate tensor among the plurality of intermediate tensors and a second element matrix corresponding to the second axis, and performing machine learning of a machine learning model with the core tensor as an input.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A is a first diagram for explaining the effect of a core tensor calculation by the core tensor calculation unit.

FIG. 7B is a second diagram for explaining the effect of a core tensor calculation by the core tensor calculation unit.

FIG. 7D is a fourth diagram for explaining the effect of a core tensor calculation by the core tensor calculation unit.

FIG. 9 is a diagram illustrating an example in which tensor data is represented in graphical form and tabular form.

DESCRIPTION OF EMBODIMENTS

In tensor decomposition, the amount of calculation increases exponentially as the number of modes increases. For example, tensor data for chemical formulas have many modes, such as atomic numbers, the number of protons, the number of charges, and the number of neutrons, and thus the amount of calculation for tensor decomposition is large. As the amount of calculation becomes larger, the amount of memory requested for the calculation becomes larger.

In one aspect, the embodiments provide a recording medium, machine learning method, and machine learning device that aims to reduce the amount of calculation for tensor decomposition.

Hereinafter, examples of a machine learning program, a machine learning method, and a machine learning device disclosed in the present application are described in detail with reference to the drawings. These examples do not limit the disclosed technology.

Example

Figures 1, 2:
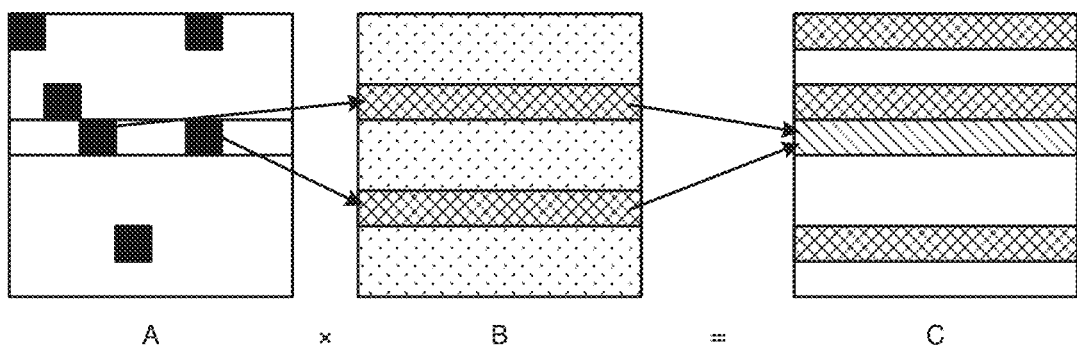
FIG. 1 is a diagram illustrating an example of a label mode and a topology mode.
FIG. 2 is a diagram for explaining a matrix product between a matrix with sparse nonzero elements and a matrix with dense nonzero elements.

First, a label mode and a topology mode are described. A machine learning device according to an example divides a mode into the topology mode and the label mode. The topology mode is a mode of representing data linkage. The label mode is a mode of representing attributes. FIG. 1 is a diagram illustrating an example of the label mode and the topology mode. As illustrated in FIG. 1, a start ID and an end ID correspond to the topological mode and a start element, an end element, and a binding correspond to the label mode. The label mode is associated with one or more modes of the topology mode, and the value of the label mode is determined by the associated topology mode.

For example, the start element is associated with the start ID, and the value of the start element is determined by the start ID. When the start ID is 1, the start element is C, when the start ID is 2 or 3, the start element is H, and when the start ID is 4, the start element is O. The end element is also associated with the end ID, and the value of the end element is determined by the end ID. When the end ID is 1, the end element is C, when the end ID is 2 or 3, the end element is H, and when the end ID is 4, the end element is O. The binding is also associated with the start ID and the end ID, and the value of the binding is determined by the start ID and the end ID. When the start ID is 1 and the end ID is 2 or 3, the binding is 1, and when the start ID is 1 and the end ID is 4, the binding is 2.

The label mode is represented as a one-hot vector. The one-hot vector is a vector in which only one element is 1 and the other elements are 0.

Next, the conversion of a mode product to a concatenation by the machine learning device according to the example is described. When a data tensor includes many label modes, nonzero elements of the data tensor are sparse. On the other hand, an element matrix is dense with nonzero elements. The calculation of a mode product is the calculation of a matrix product $X'' = (W_k)^T \times X'$, and when the data tensor includes many label modes, the number of nonzero elements in an intermediate tensor increases exponentially each time the calculation of the mode product is performed because the matrix product is calculated between a matrix with sparse nonzero elements and a matrix with dense nonzero elements.

FIG. 2 is a diagram for explaining a matrix product between a matrix with sparse nonzero elements and a matrix with dense nonzero elements. In FIG. 2, A denotes a matrix with sparse nonzero elements, B denotes a matrix with dense nonzero elements, and C denotes a matrix product between A and B. In FIG. 2, black and shaded squares indicate nonzero elements and white squares indicate zero elements. As illustrated in FIG. 2, the nonzero elements of rows of A are multiplied with corresponding rows of B to form corresponding rows of C. When there is even one nonzero element in the rows of A, all elements in the corresponding rows of C are nonzero. In this way, in the matrix product between the matrix with sparse nonzero elements and the matrix with dense nonzero elements, the number of nonzero elements increases exponentially. That is, the number of nonzero elements in an intermediate tensor increases exponentially each time the calculation of the mode product is performed.

Figure 3:
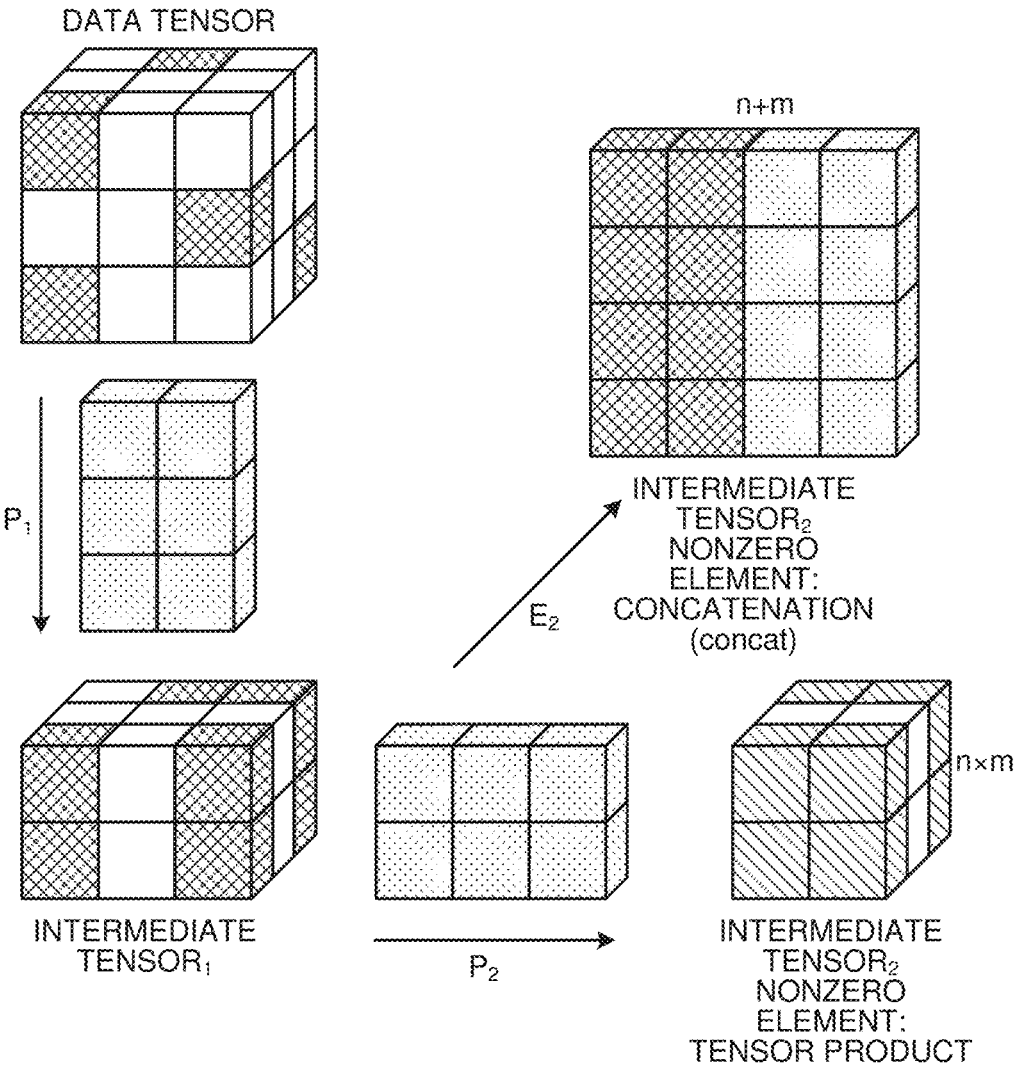
FIG. 3 is a diagram for explaining a difference between a mode product and concatenation.

Therefore, the machine learning device according to the example converts the mode product of the label mode to a concatenation. The concatenation indicates adding elements of an element matrix to elements of a data tensor or an intermediate tensor. FIG. 3 is a diagram for explaining a difference between a mode product and a concatenation. FIG. 3 illustrates a difference between a mode product $P_2$ and a concatenation $E_2$. In FIG. 3, shaded cubes indicate nonzero elements and white cubes indicate zero elements. n is a size of nonzero elements with respect to a mode "2" of an intermediate tensor$_1$, and m is a size of nonzero elements in columns of an element matrix$_2$.

As illustrated in FIG. 3, in the case of the mode product $P_2$, the size of nonzero elements in an intermediate tensor$_2$ with respect to the mode "2" is n×m, whereas in the case of the concatenation $E_2$, the size of the nonzero elements in the intermediate tensor$_2$ with respect to the mode "2" is n+m. That is, the machine learning device according to the example converts the mode product of the label mode to a concatenation, so that the number of nonzero elements increases linearly.

A tensor X with sparse nonzero elements is represented as a mixture of a pair (I, V) of an index table I and vectors V of nonzero tensor elements. In a mixed representation, rows of I correspond to coordinates of elements of V, and columns of I correspond to modes of the tensor. An $i^{th}$ row of I $$I_i = [I_i^{(1)}, \ldots, I_i^{(m)}]$$

refers to a sub-tensor unit Vi with dense nonzero elements. In the mixed representation, zero elements are not represented.

In the mixed representation, the mode product between X and the element matrix W is performed in the order of index partitioning, tensor outer product, and summation. For example, in the calculation of a mode product for a mode n, an index row is partitioned as expressed by equation (1) below.

$$[I_i^{(1)}, \ldots, I_i^{(n-1)} | I_i^{(n)}] = [I_i^{\wedge} | I_i^{(n)}] \tag{1}$$

An output index table I' of the mode product is formed from $I^{\wedge}_i$. The respective values of an output vector V' of the mode product are calculated by summing the outer products of rows of $V_1$ and corresponding rows of W, as expressed by Equation (2) below. The sum in equation (2) is calculated for i satisfying equation (3) below.

$$V'_j = \sum_{i \in nnz(I'_j)} V_i \otimes W_{I_i^{(n)}} \tag{2}$$

$$nnz(I'_j) = \{i: \hat{I}_i = I'_j\} \tag{3}$$

In the label mode, the calculation of the sum in equation (2) is eliminated and only the outer product is used. The machine learning device according to the example calculates the output vector of the concatenation by using equation (4) below.

$$V'_j = \sum_{i \in nnz(I'_j)} V_i \otimes W_{I_i^{(n)}} \tag{2}$$

$$nnz(I'_j) = \{i: \hat{I}_i = I'_j\} \tag{3}$$

The machine learning device according to the example produces an input for a neural network by flattening and concatenating the elements of V to allow a core tensor calculated by tensor decomposition to be an input for the neural network. Consequently, the outer product of the mode product and the vector concatenation include the same information, but with a different number of values. Therefore, converting the mode product of the label mode to a concatenation has no effect on training.

Figure 4:
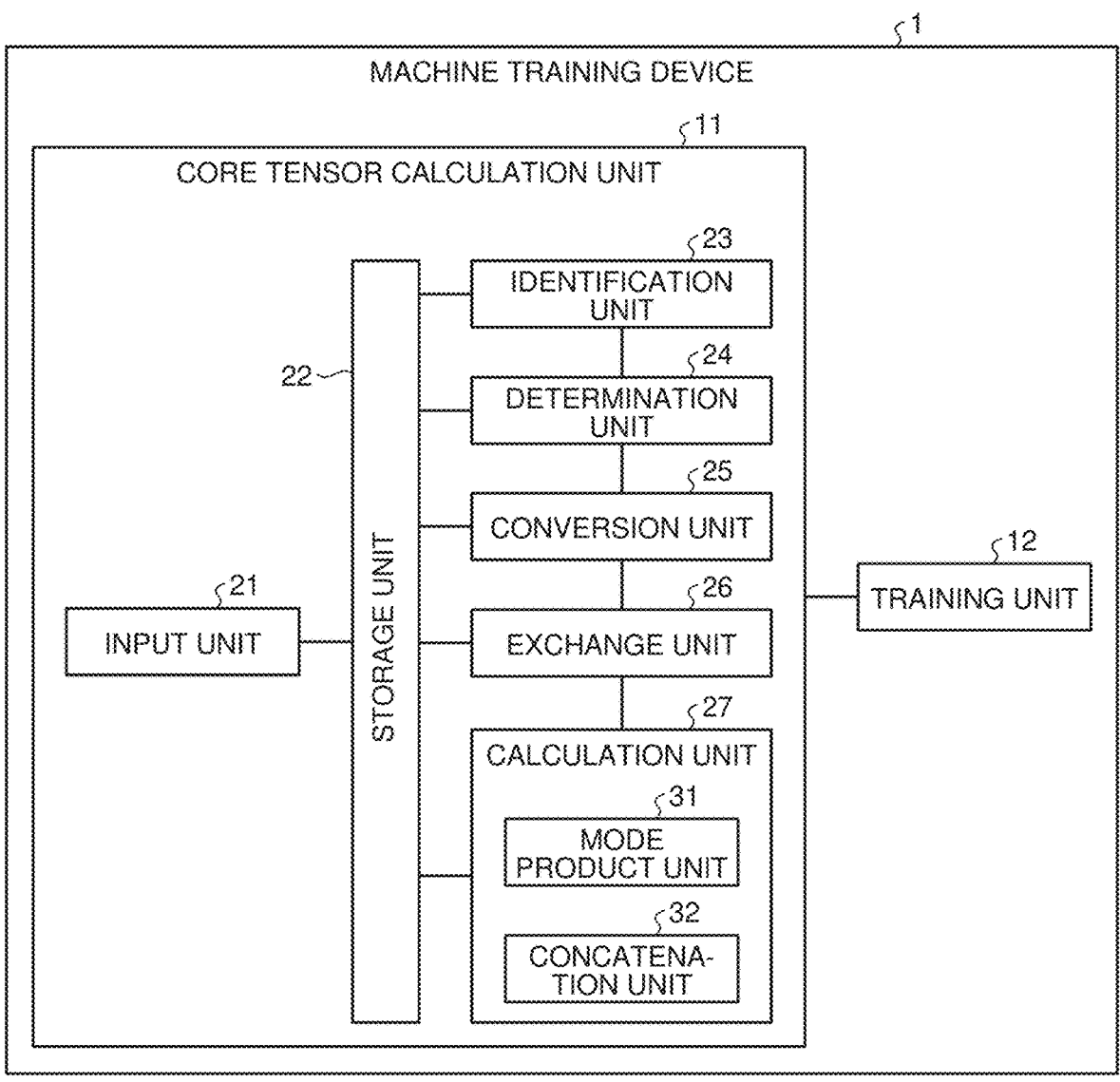
FIG. 4 is a diagram illustrating a functional configuration of a machine learning device according to an example.

Next, the functional configuration of the machine learning device according to the example is described. FIG. 4 is a diagram illustrating the functional configuration of the machine learning device according to the example. As illustrated in FIG. 4, a machine learning device 1 according to the example includes a core tensor calculation unit 11 and a training unit 12.

The core tensor calculation unit 11 receives information on a data tensor and the number of elements in each mode of a core tensor, and calculates the core tensor. The training unit 12 generates a machine learning model by performing machine learning by using the core tensor calculated by the core tensor calculation unit 11. The generated machine learning model is used for classification, prediction, or the like.

The core tensor calculation unit 11 includes an input unit 21, a storage unit 22, an identification unit 23, a determination unit 24, a conversion unit 25, an exchange unit 26, and a calculation unit 27.

The input unit 21 receives the information on the data tensor and the number of elements in each mode of the core tensor, and stores the received information in the storage unit 22.

The storage unit 22 stores the information input by the input unit 21. The storage unit 22 also stores information produced by the identification unit 23, the determination unit 24, the conversion unit 25, the exchange unit 26, and the calculation unit 27.

The identification unit 23 identifies whether each mode of the data tensor is a topology mode or a label mode, and stores the identification result in the storage unit 22. For example, when the values of all modes other than the target mode are fixed, the identification unit 23 identifies a target mode as the label mode in a case where only one value of the target mode is 1 and all the other values are 0, and identifies the target mode as the topology mode in other cases. Whether each mode of the data tensor is the topology mode or the label mode may be input by the input unit 21 and stored in the storage unit 22. Alternatively, the identification unit 23 may identify whether each mode of the data tensor is the topology mode or the label mode by inquiring of a user.

Figure 5:
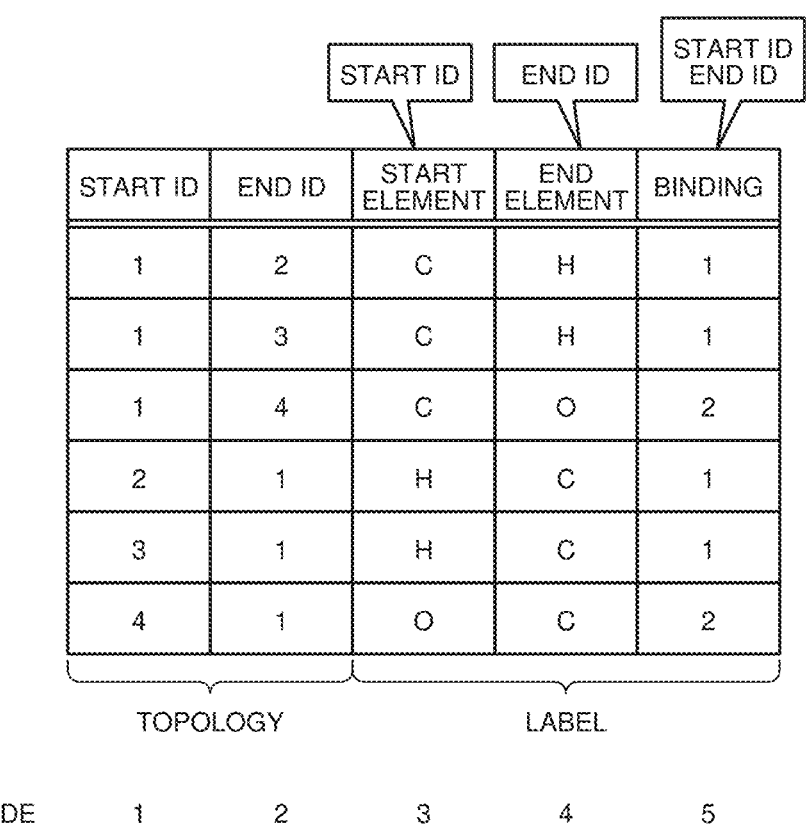
FIG. 5 is a diagram illustrating five modes.

The determination unit 24 determines the order of modes of tensor decomposition such that the label mode comes first and the topology mode comes later, and stores the determined order in the storage unit 22. For example, as illustrated in FIG. 5, when a mode of the start ID is "1", a mode of the end ID is "2", a mode of the start element is "3", a mode of the end element is "4", and a mode of the binding is "5", the determination unit 24 sets $P_5P_4P_3P_2P_1$ as a processing order of the tensor decomposition. $P_5P_4P_3P_2P_1$ indicates that the tensor decomposition process is performed in the order of $P_5$, $P_4$, $P_3$, $P_2$, and $P_1$.

The conversion unit 25 converts the mode product P of the label mode to a concatenation E and stores the conversion result in the storage unit 22. In the example illustrated in FIG. 5, since a mode "5", a mode "4" and a mode "3" are label modes, $P_5P_4P_3$ is converted to $E_5E_4E_3$, and the order of the tensor decomposition process is $E_5E_4E_3P_2P_1$.

The exchange unit 26 exchanges the processing order such that the concatenation E is processed as late as possible, and stores the exchange result in the storage unit 22. However, the exchange unit 26 exchanges the processing order under the constraint that a process of the label mode needs to be performed before a process of the topology mode associated with the label mode.

For example, in $E_5E_4E_3P_2P_1$, when $E_3$ is processed as late as possible, $E_3$ needs to be performed before $P_1$ because the mode "3" is associated with the mode "1". Consequently, $E_3$ and $P_2$ are exchanged and $E_5E_4E_3P_2P_1$ becomes $E_5E_4P_2E_3P_1$. Since the mode "5" and the mode "4" are associated with the mode "2", no further exchange occurs. By processing the concatenation E as late as possible, the core tensor calculation unit 11 can further reduce the number of nonzero elements in an intermediate tensor.

The exchange unit 26 identifies the topology mode associated with the label mode by, for example, inquiring of a user. The topology mode associated with the label mode may be input by the input unit 21 and stored in the storage unit 22.

The calculation unit 27 performs tensor decomposition on the basis of the exchange result by the exchange unit 26, and calculates the core tensor. Then, the calculation unit 27 stores information on the calculated core tensor in the storage unit 22. The calculation unit 27 includes a mode product unit 31 and a concatenation unit 32. The mode product unit 31 calculates a mode product for the topology mode. The concatenation unit 32 performs a concatenation calculation for the label mode.

Figure 6:
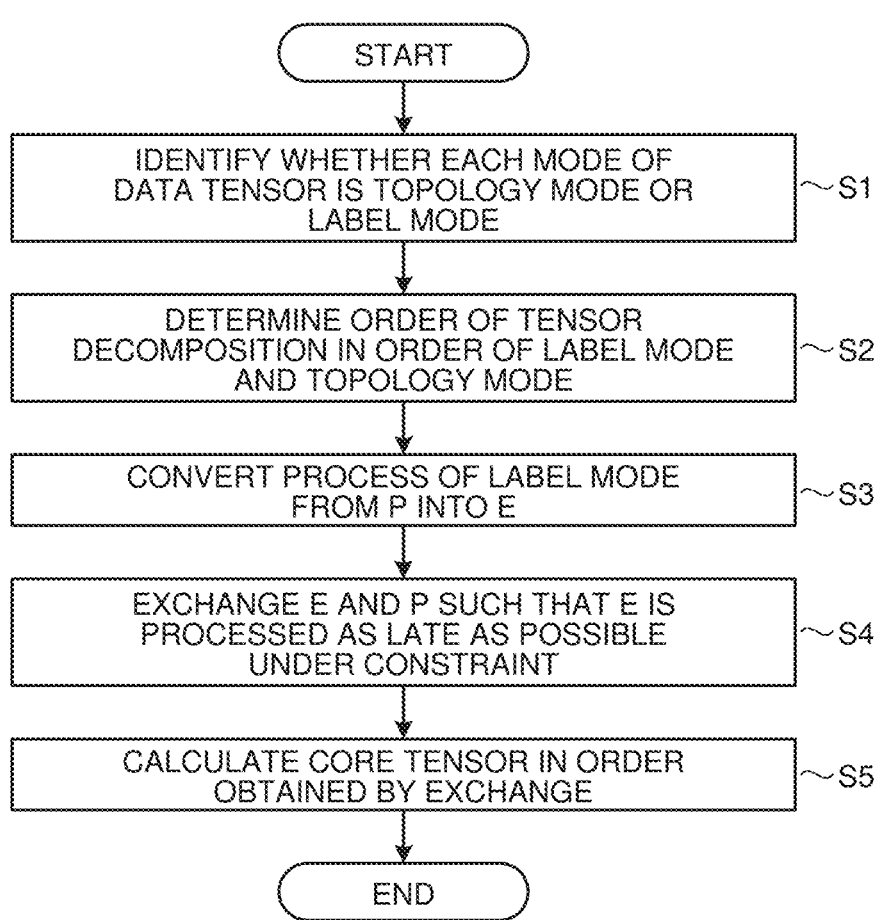
FIG. 6 is a flowchart illustrating a processing procedure by a core tensor calculation unit.

Next, the processing procedure by the core tensor calculation unit 11 is described. FIG. 6 is a flowchart illustrating the processing procedure by the core tensor calculation unit 11. As illustrated in FIG. 6, the core tensor calculation unit 11 identifies whether each mode of the data tensor is a topology mode or a label mode (step S1). Subsequently, the core tensor calculation unit 11 determines the order of tensor decomposition in the order of the label mode and the topology mode (step S2).

Subsequently, the core tensor calculation unit 11 converts the process of the label mode from P to E (step S3). Subsequently, the core tensor calculation unit 11 exchanges E and P such that E is processed as late as possible under the constraint that the process of the label mode needs to be performed before the process of the topology mode associated with the label mode (step S4). Subsequently, the core tensor calculation unit 11 calculates the core tensor in the order obtained by the exchange (step S5).

In this way, the core tensor calculation unit 11 converts the process of the label mode from P to E, so that the amount of calculation for the tensor decomposition can be reduced.

Next, the effect of the core tensor calculation by the core tensor calculation unit 11 is described. FIGS. 7A to 7E are diagrams for explaining the effect of the core tensor calculation by the core tensor calculation unit 11. In FIGS. 7A to 7E, the example illustrated in FIG. 1 is used. The effect of the core tensor calculation is represented by a form in an intermediate tensor of $P_5P_4P_2P_3P_1$ and $E_5E_4P_2E_3P_1$. The form indicates the number of nonzero elements. The number of elements in the mode "5" of the core tensor is set as a, the number of elements in the mode "4" and the mode "3" is set as b, and the number of elements in the mode "2" and the mode "1" is set as c. When the form is [a, b, c], the number of nonzero elements is a\*b\*c.

As illustrated in FIG. 7A, for the first mode "5", since the number of nonzero elements is 1, the form is [1]. Since the form of the element matrix is [2, a], the form is [1×a]=[a] by $P_5$ in the case of $P_5P_4P_2P_3P_1$ and is [1+a]=[a+1] by $E_5$ in the case of $E_5E_4P_2E_3P_1$.

For the next mode "4", as illustrated in FIG. 7B, since the form of the element matrix is [3, b], the form is [b, a] by $P_4$ in the case of $P_5P_4P_2P_3P_1$ and is [a+b+1] by $E_4$ in the case of $E_5E_4P_2E_3P_1$.

Figure 7C:
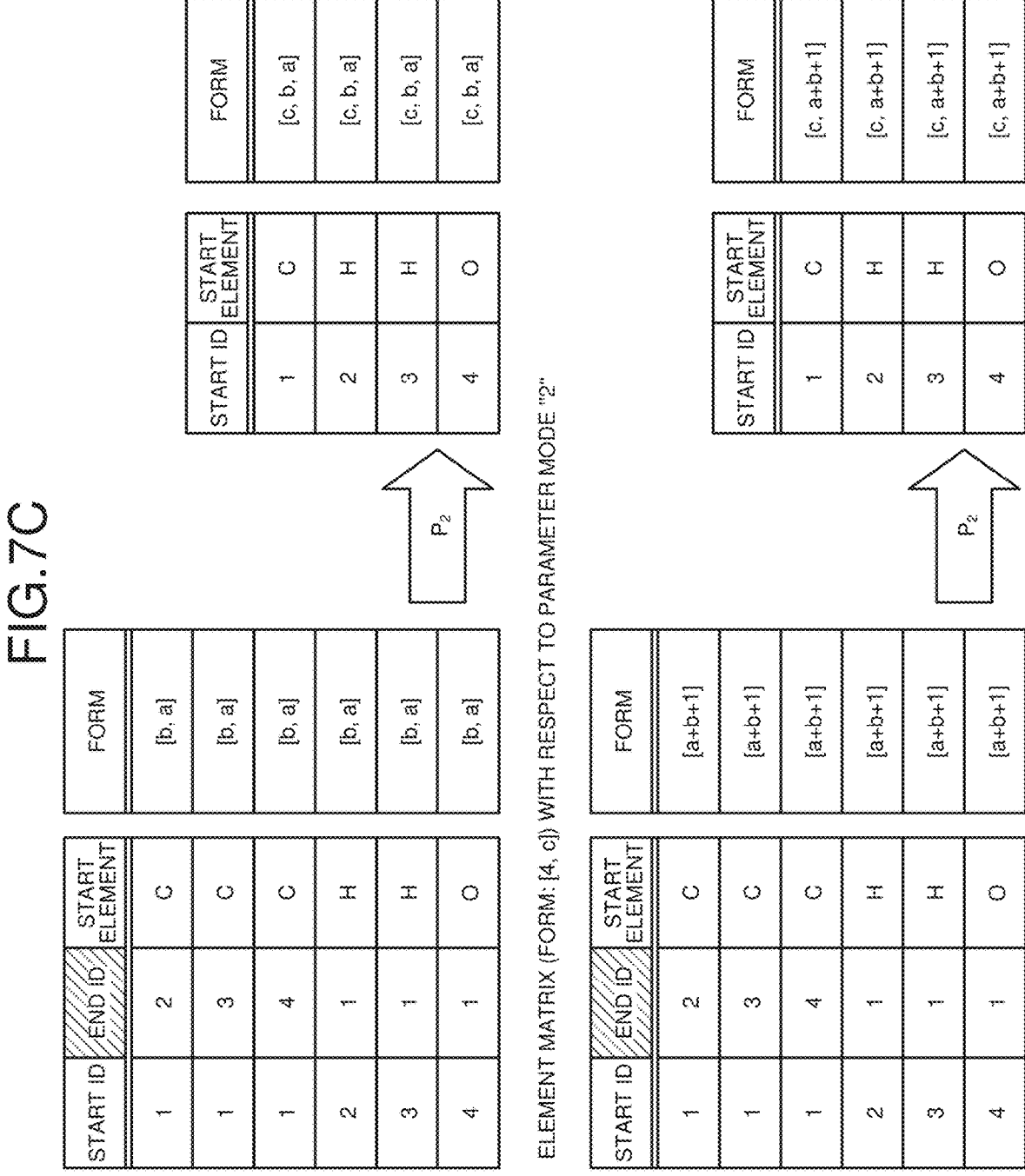
FIG. 7C is a third diagram for explaining the effect of a core tensor calculation by the core tensor calculation unit.

For the next mode "2", as illustrated in FIG. 7C, since the form of the element matrix is [4, c], the form is [c, b, a] by $P_2$ in the case of $P_5P_4P_2P_3P_1$ and is [c, a+b+1] by $P_2$ in the case of $E_5E_4P_2E_3P_1$.

For the next mode "3", as illustrated in FIG. 7D, since the form of the element matrix is [3, b], the form is [b, c, b, a] by $P_3$ in the case of $P_5P_4P_2P_3P_1$ and is [b+c(a+b+1)] by $E_3$ in the case of $E_5E_4P_2E_3P_1$.

Figure 7E:
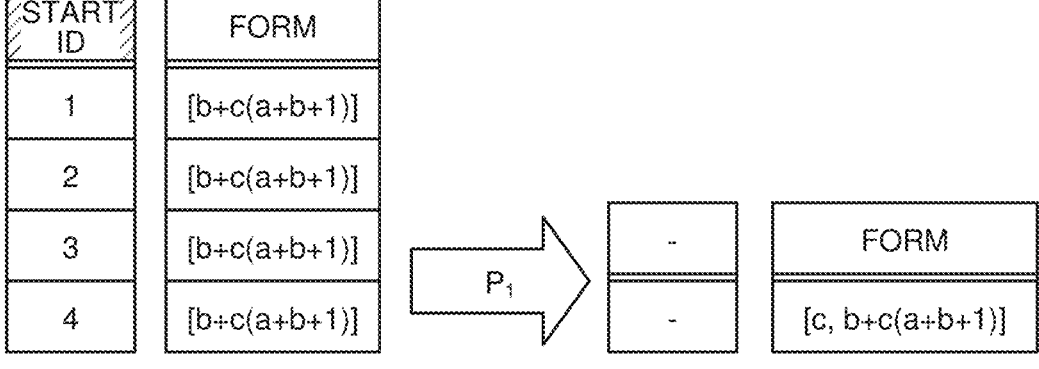
FIG. 7E is a fifth diagram for explaining the effect of a core tensor calculation by the core tensor calculation unit.

For the next mode "1", as illustrated in FIG. 7E, since the form of the element matrix is [4, c], the form is [c, b, c, b, a] by $P_1$ in the case of $P_5P_4P_2P_3P_1$ and is [c, b+c(a+b+1)] by $P_1$ in the case of $E_5E_4P_2E_3P_1$.

In this way, in the core tensor calculation, the number of nonzero elements is $c*b*c*b*a$ in the case of $P_5P_4P_2P_3P_i$, and the number of nonzero elements is $c*(b+c*(a+b+1))$ in the case of $E_5E_4P_2E_3P_1$. Consequently, the core tensor calculation unit 11 can reduce the amount of calculation in the core tensor calculation.

As described above, in the example, the identification unit 23 identifies whether each mode of the data tensor is a topology mode or a label mode, and the conversion unit 25 converts the mode product P of the label mode to the concatenation E. In the core tensor calculation, the mode product unit 31 calculates a mode product for the topology mode, and the concatenation unit 32 performs a concatenation calculation for the label mode. Consequently, the core tensor calculation unit 11 can reduce the amount of calculation for the tensor decomposition.

In the example, the exchange unit 26 exchanges the processing order of the tensor decomposition such that the concatenation E is processed as late as possible, so that the amount of calculation for the tensor decomposition can be further reduced.

In the example, the exchange unit 26 exchanges the processing order under the constraint that the process of the label mode needs to be performed before the process of the topology mode associated with the label mode, so that the amount of calculation for the tensor decomposition can be further reduced.

In the example, the machine learning device 1 is described; however, a machine learning program having the same/similar functions can be achieved by implementing the configuration of the machine learning device 1 by using software. A computer that executes the machine learning program is described below.

Figure 8:
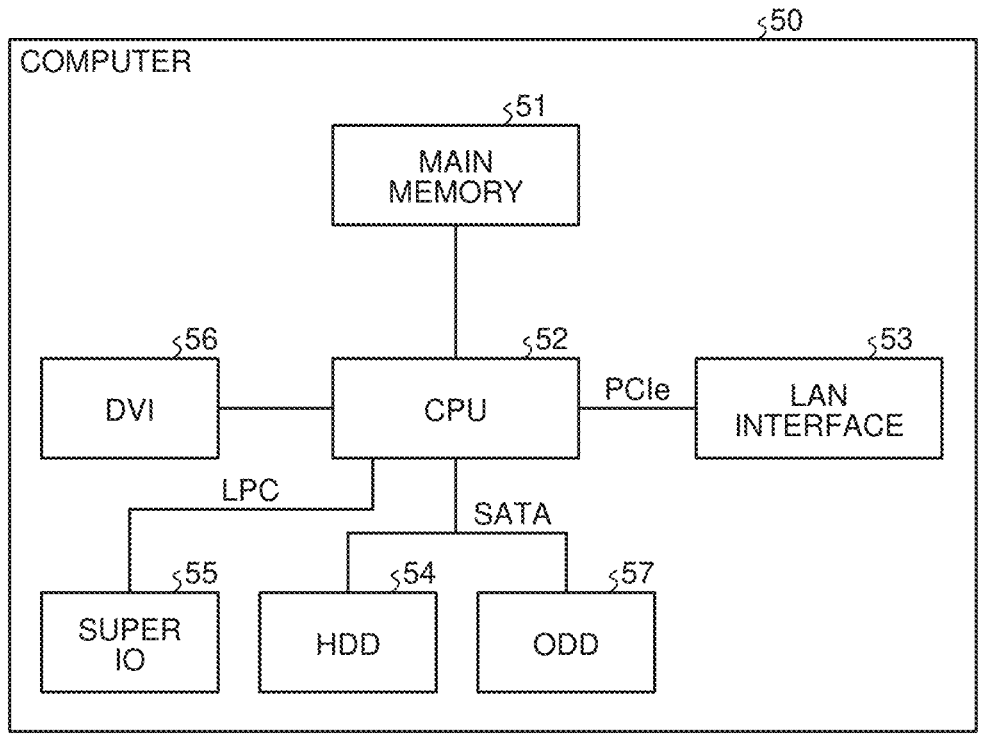
FIG. 8 is a diagram illustrating a hardware configuration of a computer that executes a machine learning program according to an example.
Figure 10:
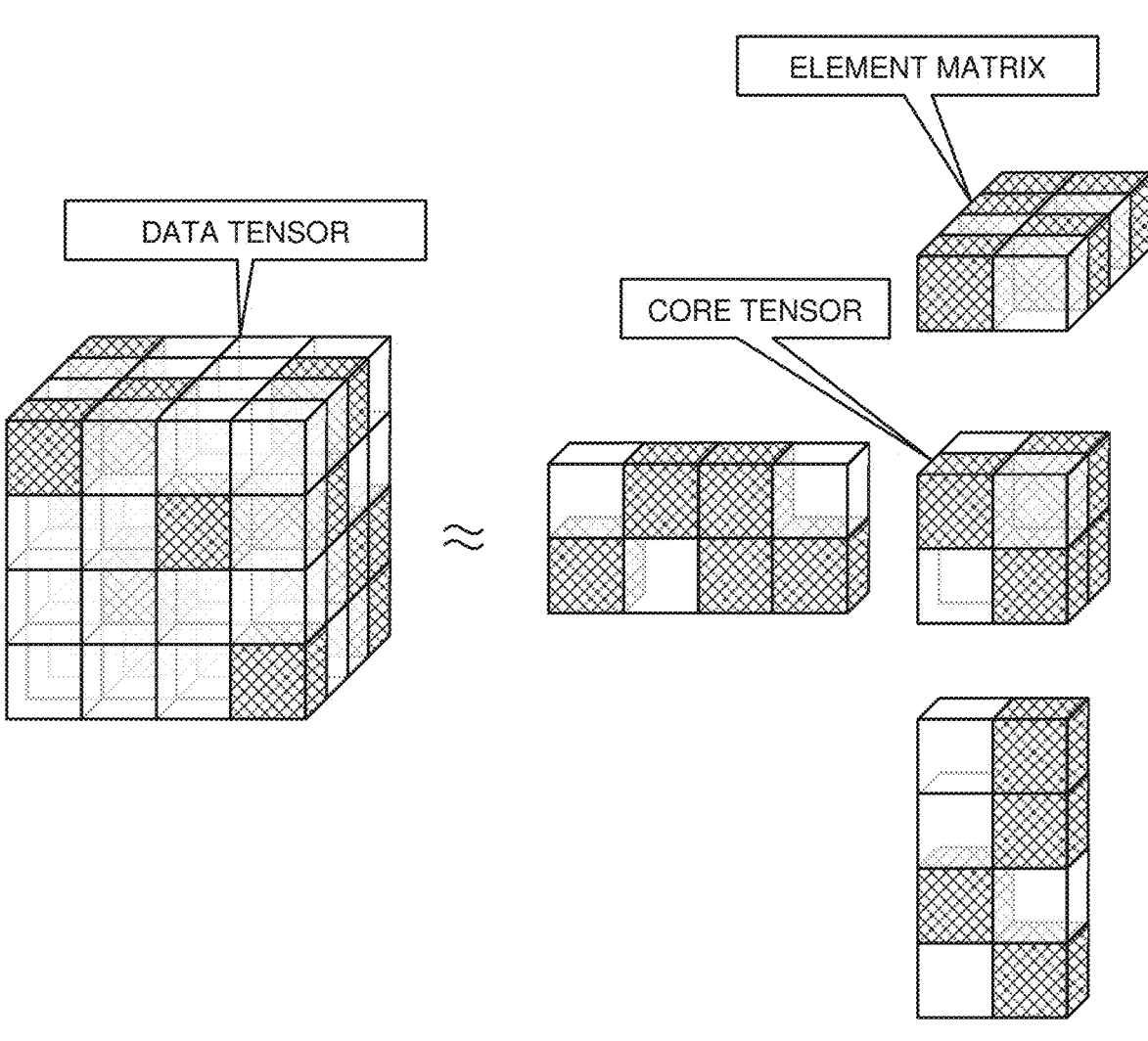
FIG. 10 is a diagram for explaining tensor decomposition.
Figure 11:
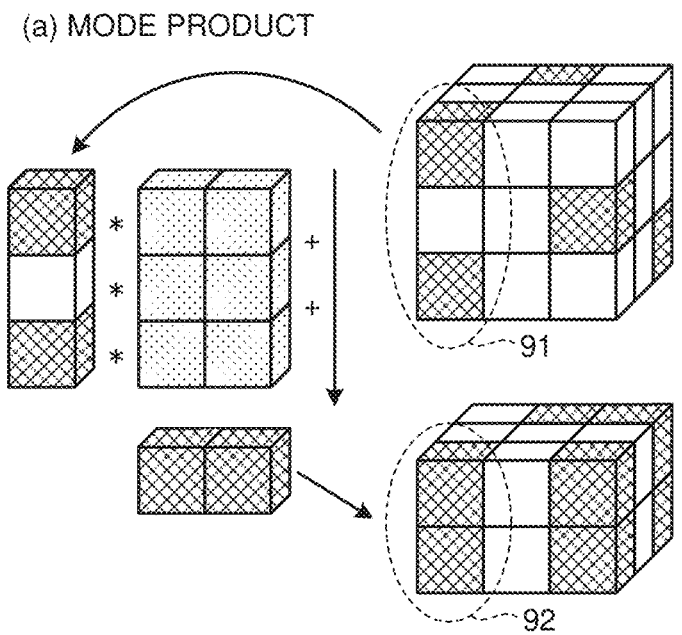
FIG. 11 is a diagram for explaining a core tensor calculation by a mode product.
Figure 11:
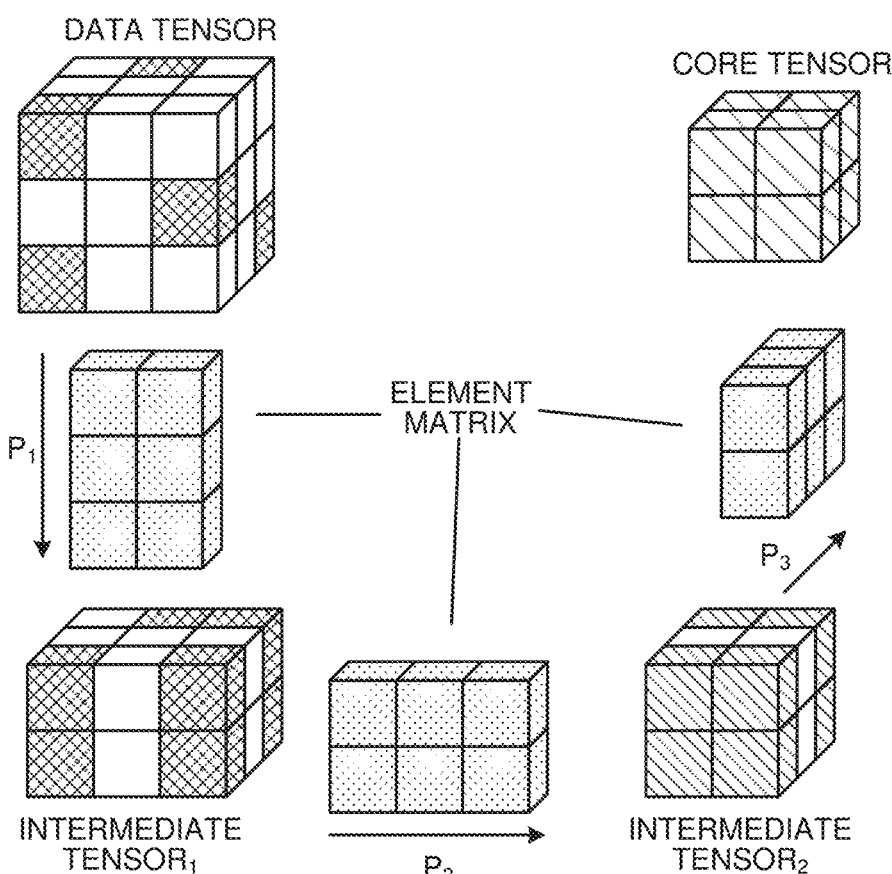

FIG. 8 is a diagram illustrating a hardware configuration of the computer that executes the machine learning program according to the example. As illustrated in FIG. 22, a computer 50 includes a main memory 51, a central processing unit (CPU) 52, a local area network (LAN) interface 53, and a hard disk drive (HDD) 54. The computer 50 further includes a super input output (IO) 55, a digital visual interface (DVI) 56, and an optical disk drive (ODD) 57.

The main memory 51 is a memory that stores computer programs, results during the execution of the computer programs, and the like. The CPU 52 is a central processing unit that reads and executes the computer programs from the main memory 51. The CPU 52 includes a chipset with a memory controller.

The LAN interface 53 is an interface for connecting the computer 50 to other computers via LAN. The HDD 54 is a disk device for storing computer programs and data, and the super IO 55 is an interface for connecting input devices such as a mouse and a keyboard. The DVI 56 is an interface for connecting a liquid crystal display device, and the ODD 57 is a device that reads and writes DVDs and CD-Rs.

The LAN interface 53 is connected to the CPU 52 by PCI express (PCIe), and the HDD 54 and the ODD 57 are connected to the CPU 52 by serial advanced technology attachment (SATA). The super IO 55 is connected to the CPU 52 by low pin count (LPC).

The machine learning program to be executed on the computer 50 is stored on CD-R, which is an example of a recording medium readable by the computer 50, and is read from the CD-R by the ODD 57 and installed on the computer 50. Alternatively, the machine learning program is stored in databases or the like of other computer systems connected via the LAN interface 53, and is read from these databases and installed in the computer 50. The installed machine learning program is stored in the HDD 54, is read into the main memory 51, and is executed by the CPU 52.

In an aspect, the present invention can reduce the amount of calculation for tensor decomposition.

What is claimed is:

1. A computer-implemented machine learning method comprising:

identifying a first axis including elements represented by one-hot vectors and a second axis including elements not represented by one-hot vectors, among a plurality of axes included in tensor-form data, using a processor;

calculating a core tensor from the tensor-form data via a plurality of intermediate tensors by a first process and a second process, the first process concatenating elements included in a first element matrix corresponding to the first axis to elements included in a first intermediate tensor among the plurality of intermediate tensors, the second process calculating a mode product between a second intermediate tensor among the plurality of intermediate tensors and a second element matrix corresponding to the second axis; and performing machine learning of a machine learning model with the core tensor as an input.

2. A machine learning device comprising:

a memory; and a processor coupled to the memory, the processor being configured to:

identify a first axis including elements represented by one-hot vectors and a second axis including elements not represented by one-hot vectors, among a plurality of axes included in tensor-form data, calculate a core tensor from the tensor-form data via a plurality of intermediate tensors by a first process and a second process, the first process concatenating elements included in a first element matrix corresponding to the first axis to elements included in a first intermediate tensor among the plurality of intermediate tensors, the second process calculating a mode product between a second intermediate tensor among the plurality of intermediate tensors and a second element matrix corresponding to the second axis, and perform machine learning of a machine learning model with the core tensor as an input.

3. A non-transitory computer-readable recording medium storing therein a machine learning program that causes a computer to execute a process, the process comprising:

identifying a first axis including elements represented by one-hot vectors and a second axis including elements not represented by one-hot vectors, among a plurality of axes included in tensor-form data;

calculating a core tensor from the tensor-form data via a plurality of intermediate tensors by a first process and a second process, the first process concatenating elements included in a first element matrix corresponding to the first axis to elements included in a first intermediate tensor among the plurality of intermediate tensors, the second process calculating a mode product between a second intermediate tensor among the plurality of intermediate tensors and a second element matrix corresponding to the second axis; and performing machine learning of a machine learning model with the core tensor as an input.

4. The non-transitory computer-readable recording medium according to claim 3, wherein the machine learning program causes the computer to further perform determining an execution order of the first process and the second process, and the calculating of the core tensor includes calculating the core tensor by performing the first process and the second process in the order determined by the process of determining.

5. The non-transitory computer-readable recording medium according to claim 4, wherein the determining includes a process of determining that the first process is performed before the second process when the elements of the first axis depend on the second axis and determining that the first process is performed after the second process when the elements of the first axis do not depend on the second axis.

6. The non-transitory computer-readable recording medium according to claim 3, wherein the identifying includes a process of identifying an axis of a label mode as the first axis and identifying an axis of a topology mode as the second axis.

* * * * *